UNITED STATES PATENT OFFICE.

WILLIAM D. RICHARDSON, OF CHICAGO, ILLINOIS, ASSIGNOR TO SWIFT & COMPANY, OF CHICAGO, ILLINOIS, A CORPORATION OF ILLINOIS.

CATALYZER AND PROCESS OF MAKING SAME.

1,151,713.

Specification of Letters Patent. Patented Aug. 31, 1915.

No Drawing.

Application filed August 19, 1912. Serial No. 715,867.

*To all whom it may concern:*

Be it known that I, WILLIAM D. RICHARDSON, a citizen of the United States of America, and a resident of Chicago, county of Cook, and State of Illinois, have invented certain new and useful Improvements in Catalyzers and Processes of Making Same, of which the following is a specification.

It is now well understood that many chemical reactions can be facilitated or brought about by the catalytic influence of certain metals in certain finely divided forms and in certain colloidal conditions.

In particular many reactions have been brought about in recent years wherein hydrogen is added to an unsaturated organic substance in the presence of finely divided nickel and similar metals prepared in certain ways. In the processes of preparing active metal which have been used up to the present time the metal has been reduced in various ways from one of its oxid salts; or a soluble salt has been precipitated as an insoluble compound and the metal has then been reduced from such insoluble compound. The insoluble compound has in most instances been deposited upon a bulky or flocculent inert material or carrier in order to obtain a large surface of the metal. As a rule, this reduction has been in the dry way by heating in the presence of hydrogen. The lower the temperature at which the reduction is effected, generally, the more active is the metal.

My invention has for its main objects the preparation of active catalytic metal, or compounds, at a comparatively low temperature and in a colloidal condition or in a fine state of suspension approaching the colloidal condition in oils or fats, and an improved process for adding hydrogen to organic substances by the use of such catalytic metal or compound.

In order to bring about this result, I use a salt or compound of the desired metal, which may be copper, cobalt, nickel, or iron, or other suitable metal, selecting a salt which is soluble in oil or fat, and dissolve it in the oil or fat, using heat if necessary. In order to reduce the active metal from the solution so obtained, I make use of a reducing substance such as hydrogen or other suitable reducing substance, and bring about reduction in the cold or by means of heat and under ordinary atmospheric pressure or higher pressures. As suitable oil soluble metallic salts for the purpose, I make use of the metallic salts of the fatty acids which are commonly known as soaps.

In performing my process, I introduce into a suitable open or closed vessel the fat or oil in which I desire to bring about the reduction with production of active catalyst, and add thereto from 1 per cent. to 50 per cent. (but less or more may be used if desired) of a metallic soap or a metallic salt of one of the higher fatty acids, for example, nickel oleate, and dissolve this by means of heat. I then introduce a suitable reducing agent, which may be hydrogen, under pressure or not as the case may be, and keep the solution and reducing agent thoroughly intermixed by means of suitable agitation, such as a mechanical stirring device. At the end of the process, the nickel or other metal is obtained in a colloidal highly active condition or in a state of extremely fine subdivision approaching the colloidal condition, and can then be used to bring about many chemical reactions such as the addition of hydrogen to unsaturated fatty acids and fats. In or after reducing the nickel soap with hydrogen, the hydrogen also tends to saturate the oil, or "harden" it.

In carrying out my process, I do not limit myself to the metals or salts or reducing agents mentioned, but make use of any suitable metallic salt or compound, provided it is soluble in oil or fat, and any suitable reducing agent, the essential point of my process being to obtain the metal in a state of fine sub-division approaching the colloidal state in oil or fat, from a suitable salt or compound which has been dissolved in the oil or fat.

What I claim is:—

1. A catalyzer made by reducing nickel from nickel oleate dissolved in an oil or fat by means of hydrogen under pressure.

2. A catalyzer made by reducing nickel from a solution of nickel oleate in an oil or fat by means of a reducing agent.

3. The process of making a catalyzer consisting in dissolving an oleate of a hydrogenating metal in oil or fat and reducing the metal therefrom by means of hydrogen.

4. The process of making a catalyzer consisting in dissolving an oleate of a hydrogenating metal in oil or fat and reducing the metal therefrom by means of a reducing agent.

5. The herein described process, which consists in dissolving nickel oleate in an oil or fat, and then reducing the nickel by a reducing agent.

6. The herein described process which consists in dissolving nickel oleate in an oil or fat, and then reducing the nickel by means of hydrogen.

7. The herein described process which consists in dissolving a soap of a hydrogenating metal in an oil or fat, and then reducing the metal by means of a reducing agent.

8. The herein described process which consists in dissolving a soap of a hydrogenating metal in an oil or fat, and then reducing the metal by means of hydrogen.

9. The herein described process comprising admixing with an oily material a salt of a hydrogenating metal with one of the higher fatty acids and adding a reducing agent to produce reduced metal in a state of fine subdivision and suspension in such oily material.

Signed at Chicago this 15th day of August 1912.

WILLIAM D. RICHARDSON.

Witnesses:
EUGENE A. RUMMLER,
CHARLES S. COLE.